United States Patent
Skärby et al.

[11] Patent Number: 6,148,217
[45] Date of Patent: Nov. 14, 2000

[54] METHOD FOR ADJUSTING THE GAIN OF AN ANTENNA SYSTEM

[75] Inventors: Ulf Skärby, Lindingö; Kristian Lindskog, Kista; Per Löfving, Mölndel, all of Sweden

[73] Assignee: Telefonaktiebolaget LM Ericsson, Stockholm, Sweden

[21] Appl. No.: 09/136,409

[22] Filed: Aug. 19, 1998

[51] Int. Cl.[7] .................................................... H04Q 7/32
[52] U.S. Cl. .......................... 455/561; 455/550; 455/561; 455/562; 455/423; 455/424; 455/67.4; 455/125; 455/232.1
[58] Field of Search ..................... 455/550, 561, 455/562, 423, 424, 60, 67.4, 67.5, 121, 123, 125, 126, 128, 575, 90, 67.1, 200.1, 226.1, 219, 232.1

[56] References Cited

U.S. PATENT DOCUMENTS

| | | | |
|---|---|---|---|
| 5,715,526 | 2/1998 | Weaver, Jr. et al. | 455/126 |
| 6,034,971 | 3/2000 | Love et al. | 455/126 |
| 6,038,459 | 3/2000 | Searle et al. | 455/423 |

FOREIGN PATENT DOCUMENTS 0 684 707  11/1995  European Pat. Off. .

*Primary Examiner*—Fan Tsang
*Attorney, Agent, or Firm*—Burns, Doane, Swecker & Mathis, L.L.P.

[57] ABSTRACT

The present invention discloses a method for quickly and easily adjusting the gain of an antenna system. According to an exemplary embodiment of the present invention, the output power of the base station's antenna system is adjusted during the base station's installation process. In the adjustment procedure, the output power of the base station is set to a predetermined value. When a switch is closed, the output power of the base station's associated active antenna system is measured and compared to a stored reference value. If the comparison indicates that the measured output power is above or below the stored reference value, the attenuation of the antenna system is automatically changed in order to properly adjust the gain of the antenna system. The present invention facilitates base station installation by providing a fast and easy gain adjustment method which requires no intervention from the base station or telephone network.

31 Claims, 3 Drawing Sheets

METHOD FOR ADJUSTING THE GAIN OF AN ANTENNA SYSTEM

BACKGROUND

The present invention relates generally to antenna systems in a cellular network and more particularly to a method for facilitating an adjustment of the gain of an antenna system in a radio base station during the base station's installation process.

The majority of countries have mobile radio systems. In order to enable the system's operators to satisfy capacity expectations with the frequency bands allotted to the operator, the mobile radio system is divided into geographical areas that are called cells. The cells contain radio base stations which allow mobile terminals to communicate with other mobile terminals and with a land-based telephone network. One radio base station can cover several areas within the cell more efficiently with the aid of directional antennas. In such a case, these areas are typically called sectors.

Radio channels that are allotted to the mobile radio system are shared by those cells that are included in the system. The same set of radio channels can be used in several cells. Cells that use the same radio channels can be spaced sufficiently apart so as not to interfere with one another. This demands careful cell planning.

First-time planning of a cell involves, among other things, choosing the respective positions of radio base stations and antennas. The power at which the antennas are permitted to transmit is governed by the positions of the radio base stations and the antennas, which in turn governs the area covered by the base stations. Improvements in capacity, for instance, may make smaller cell sizes desirable and, therefore require a reduction in the maximum permitted output power.

In order to plan a cell accurately and, at the same time, provide the highest possible output power without exceeding a permitted power level, it is desirable to control the antenna's gain both accurately and quickly.

FIG. 1 illustrates a typical base station with an associated active antenna system which, as described above, is capable of transmitting and receiving signals. Base station 100 includes a power amplifier 102, a low noise amplifier (LNA) 103, a duplex filter 104 which operate in a well known manner. Base station 100 also includes a ground-based processor 106 the operation of which will be described in more detail below. The base station 100 is connected to the antenna system 140 via feeding cable 120. The feeding cable is a coaxial or other similar type of cable. The antenna system includes an attenuator 142, a power amplifier 144, a circulator 143, a low noise amplifier 149, an antenna-mounted processor 146 and a sensing element 148.

As illustrated in FIG. 1, base station 100 is also attached to a telephone network 160. One skilled in the art will appreciate that the telephone network 160 could be either a Public Land Mobile Network (PLMN) or a Public Switched Telephone Network (PSTN).

During typical base station operations, the output power of the antenna system 140 requires adjustment in order to optimize system performance and prevent an overdrive of the antenna's power amplifier 144. Such an adjustment is desirable in order to compensate for temperature variations or loss attributable to the feeding cable which affects the system's output power. It may also be desirable to adjust the antenna's output power in order to increase/decrease the size of the antenna's coverage area.

According to conventional techniques, the output power of the antenna is measured, via sensing element 148. The measured value is transferred to the antenna-mounted processor 146 where it is compared to a reference value which is supplied from the ground-based processor 106 in the base station 100 via a communications line 122. The reference value is provided to the ground-based processor from telephone network 160. The reference value is set according to calculations from the base station controller (BSC) or the mobile services switching center (MSC) (not shown).

Once set, the reference value is continuously compared to the antenna's measured output power. When the measured output power is determined to be above or below the reference value, the attenuator 142 is set to the appropriate attenuation value in order to adjust the antenna's gain. By adjusting the gain, the desired output power of the antenna is achieved.

During those situations where it is desirable to change the reference value, e.g., when the antenna's coverage area is to be increased/decreased, conventional techniques require reprogramming of the software and/or adjusting the hardware in the telephone network and the base station. This conventional technique may not only be time consuming, but also expensive.

Therefore, there exists a need for a method which quickly and accurately measures and adjusts the gain of an antenna system.

SUMMARY

The present invention seeks to overcome the above-identified deficiencies in the art by providing a method for quickly and easily adjusting the gain of an antenna system. According to an exemplary embodiment of the present invention, the gain of the base station's antenna system is adjusted during the base station's installation process. In the adjustment procedure, the output power of the base station is set to a predetermined value. When a switch is closed in a power and battery cabinet, the output power of the base station's associated active antenna system is measured and compared to a stored reference value. If the comparison indicates that the measured output power is above or below the stored reference value, the attenuation of the antenna system is automatically changed in order to properly adjust the gain of the antenna system. By adjusting the gain of the antenna, the desired output power can be achieved. The present invention facilitates base station installation by providing a fast and easy gain adjustment method which requires no intervention from the base station or telephone network.

BRIEF DESCRIPTION OF THE DRAWINGS

The above objects and features of the present invention will be more apparent from the following description of the preferred embodiments with reference to the accompanying drawings, wherein.

DETAILED DESCRIPTION

Figure 1:
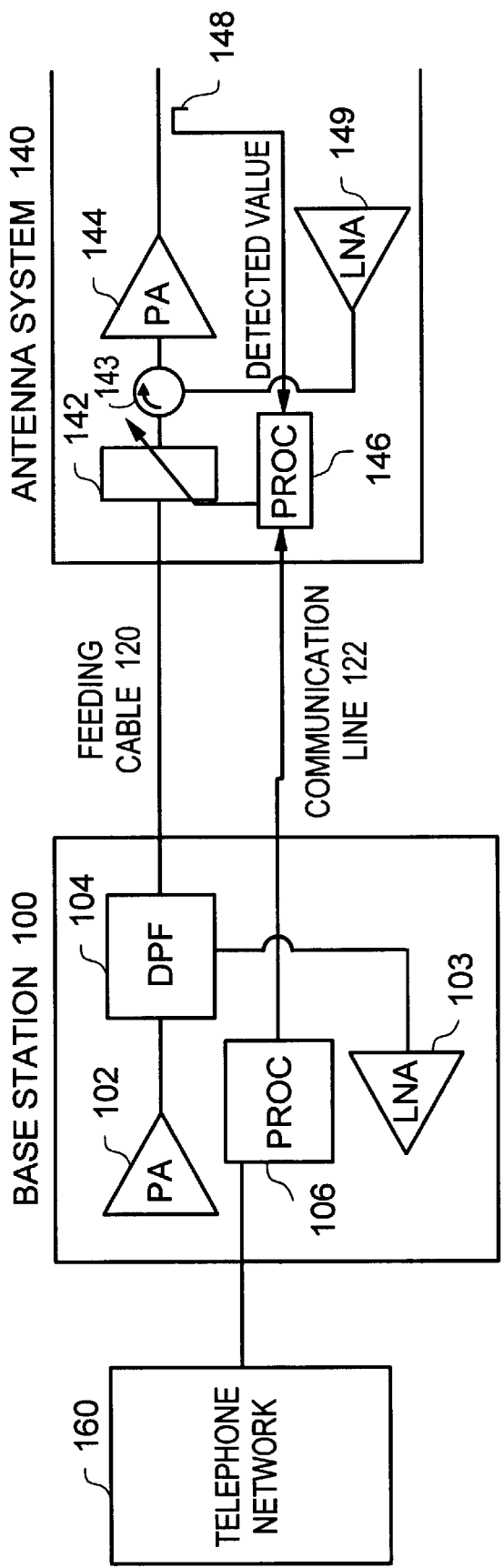
FIG. 1 illustrates a conventional radio base station with its associated antenna system.
Figure 2:
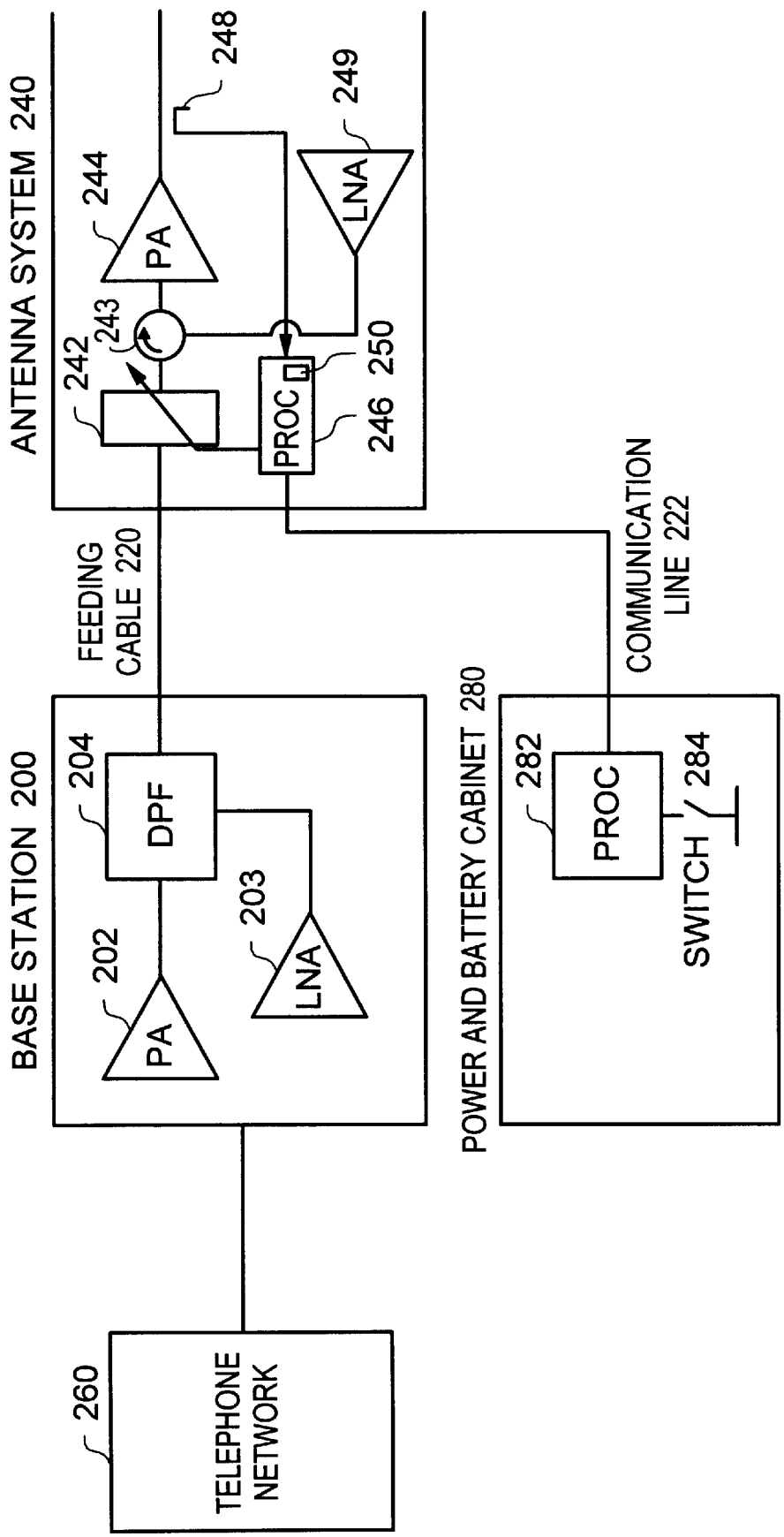
FIG. 2 illustrates an exemplary radio base station with associated control circuitry into which the method according to the present invention may be implemented.

FIG. 2 illustrates an exemplary base station in which the method according to the present invention may be incorporated. Similar to the system discussed above with respect to FIG. 1, the base station 200 includes a power amplifier 202, a duplex filter 204 and a LNA 203.

The base station 200 is connected to an attenuator 242 of an active antenna system 240 via feeding cable 220. In addition to the attenuator 242, the antenna system 240 includes a circulator 243, power amplifier 244, a LNA 249, an antenna-mounted processor 246 which controls the setting of the attenuation value in attenuator 242 and a sensing element 248 which measures the antenna's output power. As will be appreciated by those skilled in the art, the base station 200 and antenna system 240 will include additional circuitry, which aid in the sending, receiving and processing of data.

As illustrated in FIG. 2, the base station 200 is further associated with a telephone network 260 and a power and battery cabinet (PBC) 280. PBC 280 includes a display (not shown) which provides a readout of the actual feeder attenuation of the system and a switch 284 which is connected to the antenna system 240 through a ground-based processor 282. Switch 284 triggers the setting of the appropriate attenuation value in attenuator 242. According to an exemplary embodiment of the present invention, switch 284 is a manual switch (i.e., it requires an operator to open and close the switch). One skilled in the art, however, will appreciate that the switch could be designed so as to automatically open/close in response to some predetermined event.

The ground-based processor 282 is connected to the antenna-mounted processor 246 of the antenna system 240 via communication line 222. As will be appreciated by those skilled in the art, communication line 222 can be any type of communication line known in the art, such as a coaxial or fiber optic cable. Antenna-mounted processor 246 includes a memory 250 for storing a predetermined reference value.

Figure 3:
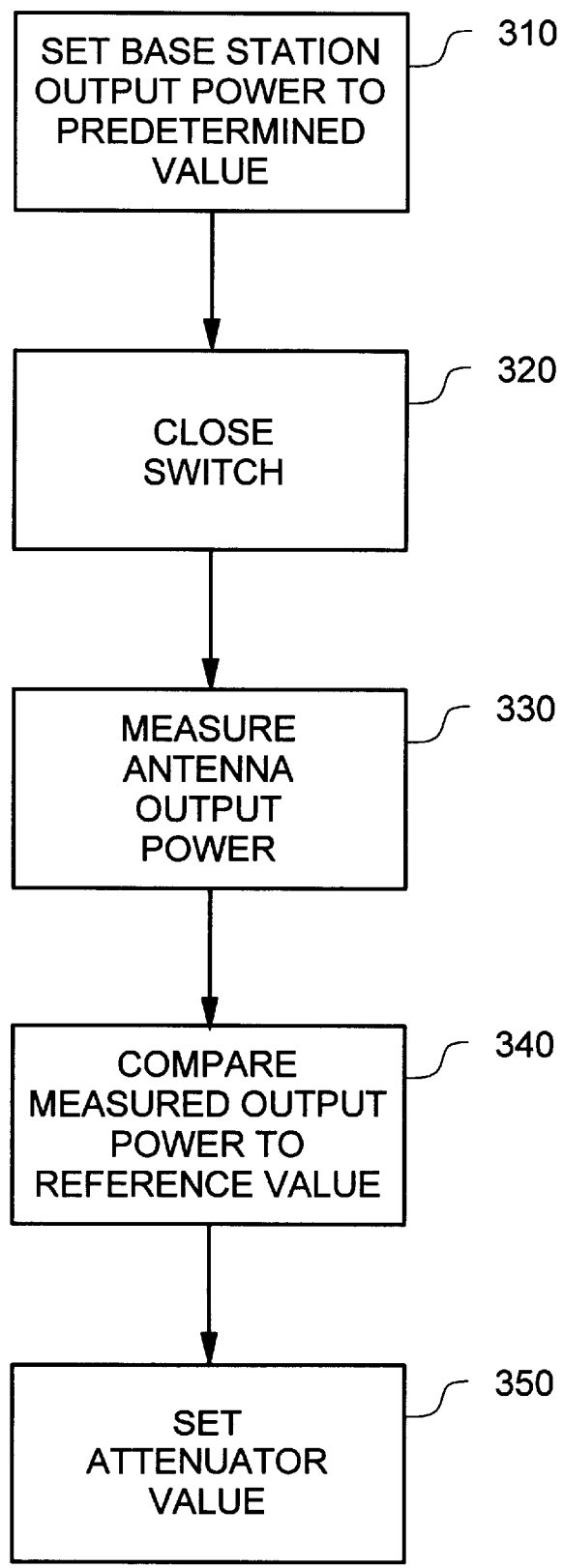
FIG. 3 illustrates an exemplary method for adjusting the power output of the base station's antenna system according to the present invention.

FIG. 3 illustrates a method for adjusting the antenna's gain according to an exemplary embodiment of the present invention. In FIG. 3, the output power of the base station 200 is initially set to a predetermined value (step 310). In response to the closing of switch 284 (step 320) in the power and battery cabinet 280, the ground-based processor 282 sends a message to the antenna-mounted processor 246 indicating that the output power of the antenna system 240 is to be measured (step 330), via sensing element 248, and compared to a reference value stored in processor 246 (step 340). According to an exemplary embodiment of the present invention, the reference value is transferred from the ground-based processor 282 to the memory 250 in the antenna-mounted processor 246 via communications line 222. It will be appreciated by one skilled in the art, however, that the reference value could be previously stored in the antenna-mounted processor 246 or alternatively, stored in hardware (i.e., in resistor values). In such an event where the reference value is previously stored in the antenna system, the closing of switch 284 would simply trigger the adjustment process of the present invention.

If the comparison of the reference value and the measured output power indicates that the output power of the antenna system 240 is above or below the reference value, then the attenuator 242 is set to an appropriate attenuation value (step 350). For example, if the antenna output power is below the reference value, then the attenuator 242 is set so as to adjust the gain of the antenna so as to increase the output power of the antenna system. The attenuation value is stored in a nonvolatile memory in attenuator 242. As a result, upon a subsequent opening of switch 284, the attenuation value remains in attenuator 242.

While the adjustment of the antenna's gain has been described above as occurring during base station installation, one skilled in the art will appreciate that the antenna's gain could also require adjusting at other times, e.g., after repairs.

As is evident from the above-described method, the gain adjustment technique, according to the present invention, is much more simple than the conventional technique described above. According to the conventional technique, the antenna's output power is continuously monitored and compared to the reference value. The antenna's output power is then adjusted when the comparison so indicates. The setting of the reference value according to the conventional technique requires interaction between the antenna system and the telephone network, via the base station. Once set, altering the reference value requires software reprogramming and hardware replacement in both the telephone network and base station which is very time consuming and expensive.

To the contrary, the gain adjustment method of the present invention is much simpler in that the adjustment procedure is performed only during base station installation, and not continuously. The reference value is supplied to the antenna system from the PBC via a direct communications link or is stored in the antenna system during its construction. As a result, the adjustment procedure of the present invention requires no interaction with the telephone network, thereby eliminating the need to reprogram the telephone network and base station. By simply setting the output power of the base station and closing a switch, the gain of the antenna system, according to the present invention, is automatically adjusted. Once adjusted, the gain of the antenna system remains substantially constant (i.e., discounting effects associated with component aging).

One skilled in the art will recognize that, as an alternative embodiment, the attenuator could be manually changed. In such an embodiment, an operator would manually increase/decrease the attenuation in attenuator 242 until an indicator, such as a lamp, indicates that the gain has reached a predetermined threshold.

The foregoing has described the principles, preferred embodiments and modes of operation of the present invention. However, the invention should not be construed as being limited to the particular embodiments discussed above. For example, while the above description focused on the gain adjustment in the antenna's transmit chain, one skilled in the art will appreciate that the gain adjustment method described above is equally applicable in the antenna's receive chain in order to achieve a desired receive signal strength. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method for adjusting a gain of a base station's antenna system for both a transmit and receive path in order to achieve a desired output power and a desired receive signal strength, said method comprising the steps of:

setting an output power of the base station to a predetermined value;

closing a switch in a cabinet unit;

sending, in response to the closing of said switch, a signal from a ground-based processor in said cabinet unit to an antenna-mounted processor indicating that an output power of said antenna system is to be measured;

measuring the output power of the antenna system;

comparing said measured antenna output power to a reference value stored in said antenna-mounted processor; and setting, in response to said comparison, an appropriate attenuation value in order to adjust the antenna's gain;

wherein said signal is transferred via a direct communications link from said cabinet unit to said antenna system.

2. The method of claim 1 wherein said switch is a manual switch.

3. The method of claim 1 wherein said switch is automatically closed in response to a predetermined event.

4. The method of claim 1 wherein the adjustment occurs in response to an installation of the base station.

5. The method of claim 1 wherein the adjustment occurs in response to a repair of the base station.

6. The method of claim 1 wherein said reference value is supplied to said antenna-mounted processor from said ground-based processor via said direct communications link.

7. The method of claim 1 wherein said reference value is stored in said antenna-mounted processor prior to said step of closing said switch.

8. The method of claim 1 wherein said step of setting an appropriate attenuation value comprises the step of storing said attenuation value in a nonvolatile memory.

9. A method for adjusting a gain of a base station's antenna system, said method comprising the steps of:

setting an output power of the base station to a predetermined value;

closing a switch;

sending, in response to the closing of said switch, a signal from a ground-based processor in a cabinet unit to an antenna-mounted processor indicating that an output power of said antenna system is to be measured;

measuring the output power of the antenna system;

comparing said measured antenna output power to a reference value stored in said antenna-mounted processor; and setting, in response to said comparison, an appropriate attenuation value in order to adjust the antenna's gain;

wherein the adjustment of the antenna's gain occurs only during a base station's installation process.

10. The method of claim 9 wherein said switch is a manual switch.

11. The method of claim 9 wherein said switch is automatically closed in response to a predetermined event.

12. The method of claim 9 wherein said signal is transferred via a direct communications link from said cabinet unit to said antenna-mounted processor.

13. The method of claim 9 wherein said step of setting an appropriate attenuation value comprises the step of storing said attenuation value in a nonvolatile memory.

14. The method of claim 9 wherein said reference value is supplied to said antenna-mounted processor from said ground-based processor via a direct communications link.

15. The method of claim 9 further comprising the step of:

storing said reference value in said antenna-mounted processor;

wherein said step of storing occurs prior to the step of closing said switch.

16. A system for adjusting a gain of a base station's antenna system, said system comprising:

means for setting an output power of the base station to a predetermined value;

a switch in a cabinet unit for triggering an adjustment of the gain of said antenna system;

a ground-based processor in said cabinet unit for sending to an antenna-mounted processor, in response to closing of said switch, an indication that an output power of said antenna system is to be measured;

means for measuring the output power of the antenna system;

means for comparing said measured antenna output power to a reference value stored in said antenna-mounted processor; and means for setting an appropriate attenuation value in order to adjust the antenna's gain;

wherein said indication is transferred via a direct communications link from said cabinet unit to said antenna-mounted processor.

17. The system of claim 16 wherein said switch is a manual switch.

18. The system of claim 16 wherein said switch is automatically closed in response to a predetermined event.

19. The system of claim 16 wherein the adjustment occurs in response to an installation of the base station.

20. The system of claim 16 wherein the adjustment occurs in response to a repair of the base station.

21. The system of claim 16 further comprising a nonvolatile memory for storing said attenuation value.

22. The system of claim 16 wherein said reference value is supplied to said antenna-mounted processor from said ground-based processor via said direct communications link.

23. The system of claim 16 wherein said reference value is stored in said antenna-mounted processor prior to said closing said switch.

24. A system for adjusting a gain of a base station's antenna system, said system comprising:

means for setting an output power of the base station to a predetermined value;

a switch for triggering an adjustment of the gain of said antenna system;

a ground-based processor in a cabinet unit for sending to an antenna-mounted processor, in response to closing of said switch, an indication that an output gain of said antenna system is to be measured;

means for measuring the output power of the antenna system;

means for comparing said measured antenna output power to a reference value stored in said antenna-mounted processor; and means for setting an appropriate attenuation value in order to adjust the antenna's gain;

wherein the adjustment of the antenna's gain occurs only during a base station's installation process.

25. The system of claim 24 wherein said switch is a manual switch.

26. The system of claim 24 wherein said switch is automatically closed in response to a predetermined event.

27. The system of claim 24 wherein said indication is transferred via a direct communication link from said cabinet unit to said antenna-mounted processor.

28. The system of claim 24 further comprising a nonvolatile memory for storing said attenuation value.

29. The system of claim 24 wherein said reference value is supplied to said antenna-mounted processor from said ground-based processor via a direct communications link.

30. The system of claim 24 wherein said reference value is stored in said antenna-mounted processor prior to said closing said switch.

31. The system of claim 24 wherein said gain remains constant following said base station installation.

* * * * *